US006957536B2

United States Patent
Litwin et al.

(10) Patent No.: US 6,957,536 B2
(45) Date of Patent: *Oct. 25, 2005

(54) SYSTEMS AND METHODS FOR GENERATING ELECTRICAL POWER FROM SOLAR ENERGY

(75) Inventors: Robert Z. Litwin, Canoga Park, CA (US); Adon Delgado, Jr., West Hills, CA (US); Michael P. Moriarty, Simi Valley, CA (US); Charles M. Jones, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 16 days.

This patent is subject to a terminal disclaimer.

(21) Appl. No.: 10/453,065

(22) Filed: Jun. 3, 2003

(65) Prior Publication Data

US 2004/0244376 A1 Dec. 9, 2004

(51) Int. Cl.[7] .............................................. B60K 16/00
(52) U.S. Cl. ................. 60/641.8; 60/641.11; 60/641.15
(58) Field of Search .......................... 60/641.8, 641.11, 60/641.15

(56) References Cited

U.S. PATENT DOCUMENTS

| 4,433,673 | A | * | 2/1984 | Vierling ........................ 126/619 |
| 4,485,803 | A | * | 12/1984 | Wiener ......................... 126/591 |
| 4,512,336 | A | * | 4/1985 | Wiener ......................... 126/651 |
| 4,602,614 | A | * | 7/1986 | Percival et al. .............. 126/609 |
| 5,404,723 | A | * | 4/1995 | Parker et al. ............. 60/641.15 |
| 5,417,052 | A | | 5/1995 | Bharathan et al. |
| 5,444,972 | A | | 8/1995 | Moore |
| 5,482,233 | A | | 1/1996 | Marko et al. |
| 5,850,831 | A | | 12/1998 | Marko |
| 5,862,800 | A | | 1/1999 | Marko |
| 5,934,076 | A | * | 8/1999 | Coney ........................... 60/617 |
| 6,470,683 | B1 | * | 10/2002 | Childs et al. ............... 60/641.8 |
| 6,606,860 | B2 | * | 8/2003 | McFarland .................... 60/648 |
| 6,668,555 | B1 | * | 12/2003 | Moriarty .................... 60/641.8 |
| 2004/0086021 | A1 | * | 5/2004 | Litwin ......................... 374/120 |

OTHER PUBLICATIONS

U.S. Appl. No. 09/946,804, filed Sep. 5, 2001, Marko, Entitled "Thin Wall Header For Use in Molten Salt Solar Absorption Panels".
U.S. Appl. No. 10/286,200, filed Nov. 1, 2002, Litwin, entitled "Infrared Temperature Sensors for Solar Panel".
U.S. Appl. No. 10/291,927, filed Nov. 11, 2002, Litwin, Entitled "Molten Salt Receiver Cooling System".
U.S. Appl. No. 10/301,923, filed Nov. 22, 2002, Litwin, entitled "Expansion Bellows for Use in Solar Molten Salt Piping and Valves".
U.S. Appl. No. 10/306,480, filed Nov. 27, 2002, Litwin, entitled "Methods and Apparatus for Generating and Storing Solar Energy".

(Continued)

Primary Examiner—Hoang Nguyen
(74) Attorney, Agent, or Firm—Harness Dickey & Pierce P.L.C.

(57) ABSTRACT

Systems and methods capable of producing electrical power from solar energy through the use of air cycles without fossil fuel combustion. The system includes a solar receiver, a generator, a compressor, and an expander. The expander is coupled to the generator to drive the generator and coupled to the compressor to drive the compressor. The system uses solar generated heat from the solar receiver to heat compressed air from the compressor. The solar generated heat can be directly transferred from the solar receiver to the compressed air as the compressed air flows through receiver tubes of the solar receiver, or the solar receiver can transfer the solar generated heat to a liquid metal, with the liquid metal transferring thermal energy to the compressed air. The expander receives and expands the heated compressed air to drive the generator to produce electricity, and to drive the compressor to compress air.

41 Claims, 3 Drawing Sheets

OTHER PUBLICATIONS

U.S. Appl. No. 10/310,320, filed Dec. 5, 2002, Litwin, entitled "Bottom Supported Solar Receiver Panel Tube Design".

U.S. Appl. No. 10/318,890, filed Dec. 31, 2002, Litwin, entitled "Solar Receiver with Inboard Headers".

* cited by examiner

SYSTEMS AND METHODS FOR GENERATING ELECTRICAL POWER FROM SOLAR ENERGY

FIELD

The present invention relates generally to electrical power generation systems, and more particularly to systems and methods that generate electrical power from solar energy.

BACKGROUND

There is a continuing demand for clean renewable energy sources, such as solar power. Although solar power is becoming more common, the relatively high costs associated with generating electrical power from solar energy are somewhat prohibitive. Without drastic cost reductions in the installation, operation, maintenance, etc. of solar power plants, the environmental and other benefits of solar power will remain for the most part unrealized.

In addition, some solar power concepts burn or combust fossil fuels, such as natural gas, to further heat the air, which has been preheated by solar generated heat. These systems utilize solar generated heat in conjunction with fossil fuel combustion to save fossil fuel. Although preheating the air with solar generated heat decreases pollutants and emissions compared to conventional fossil fuel power plants, the fossil fuel combustion still produces some pollutants and emissions.

While the advancements in solar power technology have done much to provide cleaner (i.e., less polluting and more environmentally friendly) sources of energy, the inventors have recognized a need for even cleaner and more cost effective ways of producing dispatchable electrical power with less pollutants and emissions.

SUMMARY

In order to solve these and other needs in the art, the inventors hereof have succeeded in designing systems and methods capable of generating electrical power from solar energy through the use of air cycles, such as a Brayton air cycle, without the need for fossil fuel combustion or steam generation.

In one exemplary embodiment, the system includes a generator, a compressor, and an expander. The expander is coupled to both the generator to drive the generator and coupled to the compressor to drive the compressor. The system also includes a liquid metal source and a solar receiver. The solar receiver receives liquid metal from the source and transfers solar generated heat to the liquid metal. The system also includes a heat exchanger that permits the heated liquid metal to transfer thermal energy to compressed air from the compressor. The expander receives and expands the heated compressed air, which has been heated within the heat exchanger, to drive the generator to produce electricity, and to drive the compressor to compress air. Accordingly, the system is capable of producing electricity from solar energy in an air cycle without fossil fuel combustion or steam generation.

In another exemplary embodiment, the system includes a solar receiver, a generator, a compressor, and an expander. The expander is coupled to both the generator to drive the generator and coupled to the compressor to drive the compressor. The solar receiver includes a plurality of receiver tubes adapted to receive the compressed air. The solar receiver transfers solar generated heat to the compressed air as the compressed air flows through the receiver tubes. The expander receives and expands the heated compressed air, which has been heated by the solar receiver, to drive the generator to produce electricity, and to drive the compressor to compress air. Accordingly, the system is capable of producing electricity from solar energy in an air cycle without fossil fuel combustion or steam generation.

In another form, the invention provides methods for generating electrical power in an air cycle without the need for either fossil fuel combustion or steam generation. In one embodiment, the method generally comprises: compressing air; heating the compressed air with solar generated heat from a solar receiver; and expanding the heated compressed air to drive a generator to produce electricity, and to drive a compressor to compress air.

Further areas of applicability of the present invention will become apparent from the detailed description provided hereinafter. It should be understood that the detailed description and specific examples, while indicating at least one exemplary embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference characters indicate corresponding features throughout the drawings.

DETAILED DESCRIPTION OF THE EXEMPLARY EMBODIMENTS

Figure 1:
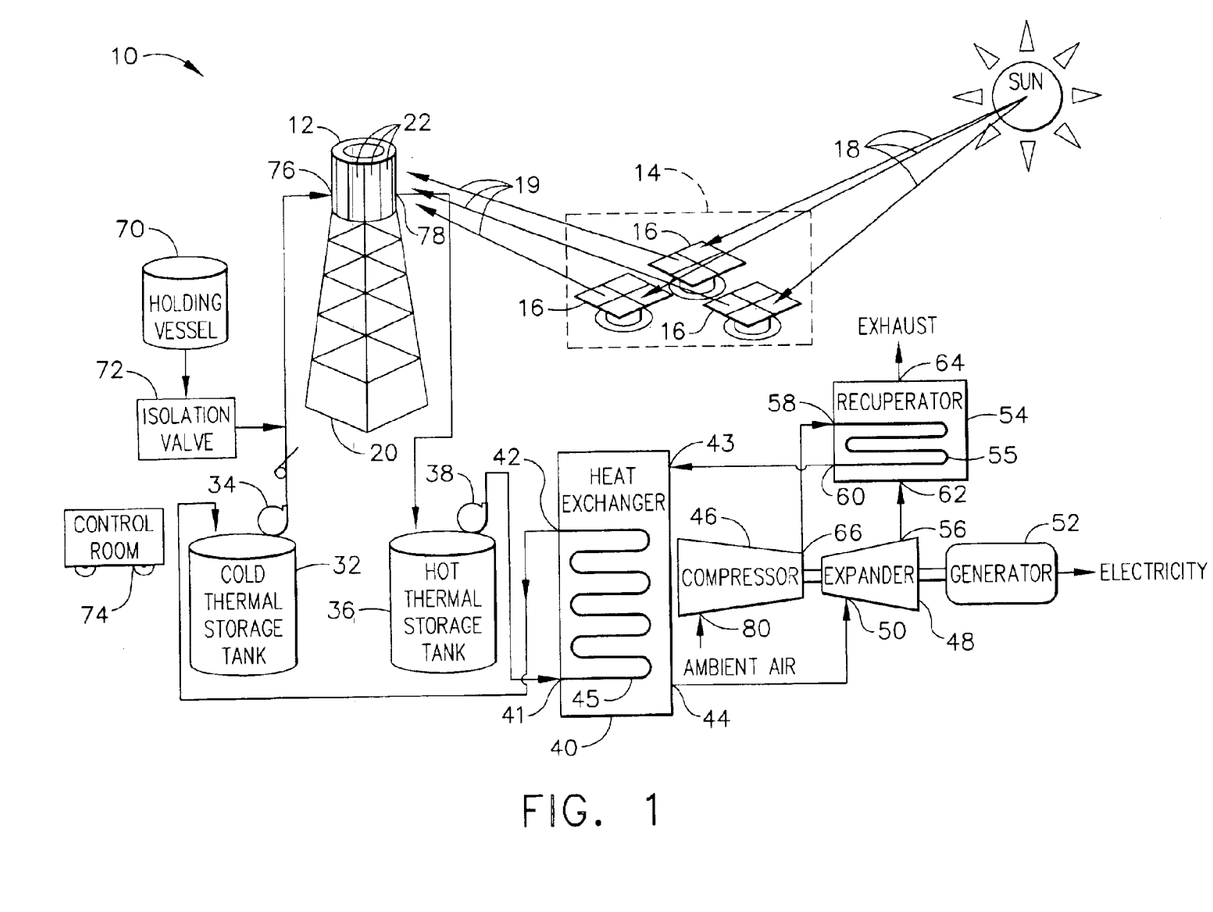
FIG. 1 is a schematic of a system for generating electrical power from solar energy according to one embodiment of the invention.

FIG. 1 is a schematic representation of a system 10 capable of generating electrical power from solar energy through the use of an air cycle, such as a Brayton air cycle, without the need for or requiring fossil fuel combustion or steam generation in accordance with an exemplary embodiment of the invention. As shown, the system 10 includes a solar receiver 12 and a collector system 14. The collector system 14 includes a plurality of sun tracking mirrors called heliostats 16. The heliostats 16 redirect and concentrate solar radiation 18 from the sun onto the solar receiver 12, which then converts the redirected sunlight 19 to thermal energy or heat.

As shown in FIG. 1, the solar receiver 12 is mounted on a tower 20. The tower 20 is typically 50 feet to 250 feet (15.24 meters to 76.20 meters) or more in height.

With further reference to FIG. 1, the solar receiver 12 in the illustrated embodiment includes a plurality of solar receiver panels 22 positioned circumferentially around an outside wall of the solar receiver 12. Therefore, the surface area of solar receiver 12 is the cumulative area of the outward facing surfaces of receiver panels 22. Alternatively, other receiver types may also be used for the solar receiver depending on the particular application in which the system will be used. In another embodiment, the solar receiver comprises a one-sided or billboard type of receiver in which one or more solar receiver panels are positioned on one side of the solar receiver.

Figure 2:
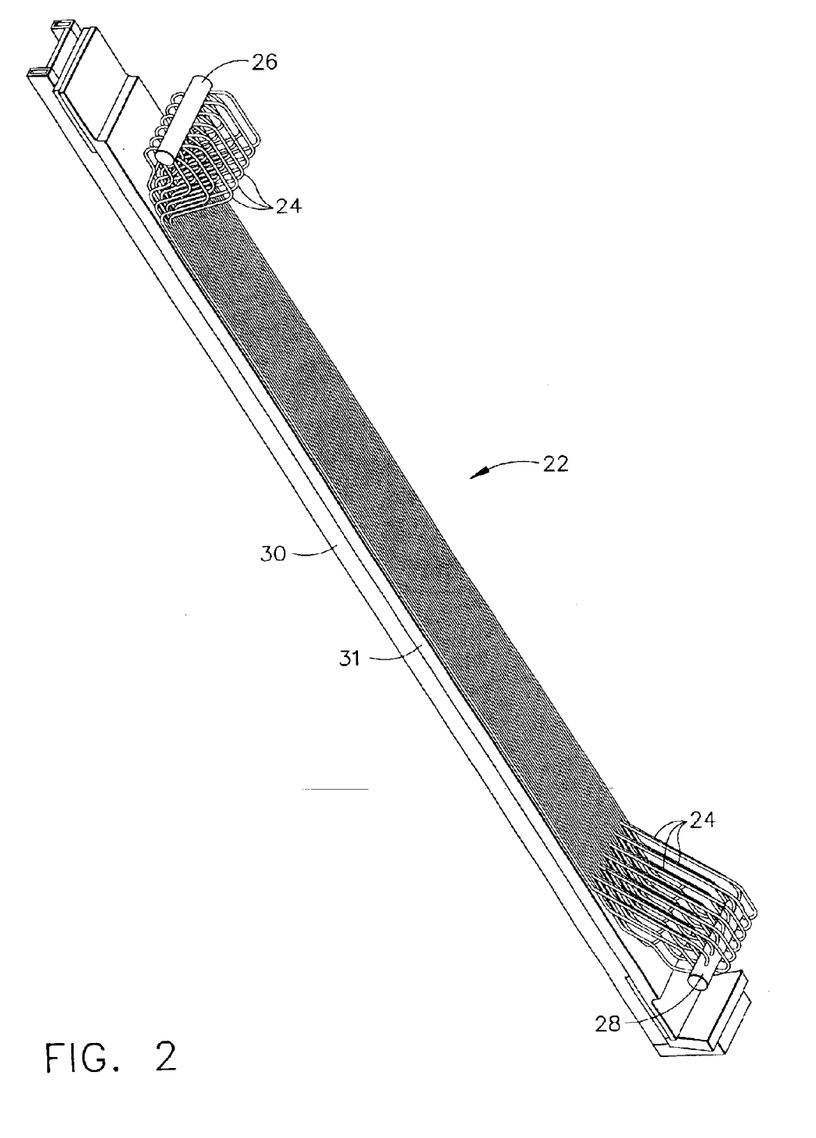
FIG. 2 is a schematic of an exemplary solar receiver panel that may be utilized in the solar receiver of the system shown in FIG. 1.

In the exemplary embodiment of FIG. 2, each solar receiver panel 22 includes a plurality of receiver tubes 24 through which a heat transfer fluid flows. As the fluid is passing through the tubes 24, the solar receiver 12 converts the solar radiation to thermal energy and transfers the thermal energy to the fluid. The tubes 24 may include internal fins to increase the internal surface area of the tubes 24, thereby increasing heat transfer to the air passing within the tubes 24.

FIG. 2 is a schematic of an exemplary solar receiver panel 22 that may be utilized in the system 10, shown in FIG. 1. As shown in FIG. 2, each solar receiver panel 22 includes a plurality of receiver tubes 24 and a top header 26 on the top of the solar receiver panel 22. The top header 26 is connected to a bottom header 28 on the bottom of receiver panel 22 by receiver tubes 24. A strong back, or box beam structure, 30 provides rigidity to each receiver panel 24, and insulation 31 is provided between the strong back 30 and the receiver tubes 24.

In one embodiment, a relatively cold fluid is pumped from a source (e.g., cold thermal storage tank 32) into either the top header 26 of bottom header 28 of a first receiver panel 22. The fluid then flows through receiver tubes 24 to the other one of the bottom or top header 28 or 26, respectively. The fluid is then pumped through a jumper pipe (not shown) to the appropriate corresponding header 28 or 26 of an adjacent solar receiver panel 22 (not shown), where it flows through the receiver tubes 24 of that receiver panel 22 in the opposite direction of the previous receiver panel 22. The fluid then continues to a subsequent receiver panel 22 (not shown), through which it flows again in the opposite direction. Thus, the fluid is pumped through all the solar receiver panels 22 in a serpentine manner. That is, the fluid flows up through the receiver tubes 24 of one receiver panel 22 and down through the receiver tubes 24 of the next receiver panel 22 until it has been circulated through all the solar receiver panels 22, at which point the fluid, which is now heated, is discharged from the solar receiver 12. In another embodiment, fluid flows in parallel streams through the panels 22 simulataneously in a once-through fashion.

As shown in FIG. 1, the source of the fluid pumped to the solar receiver 12 comprises a cold thermal storage tank 32. The cold thermal storage tank 32 generally lies at ground level in close proximity to the tower 20. Alternatively, the cold thermal storage tank 32 can also be positioned on the tower 20.

The cold thermal storage tank 32 may be sized according to the electrical power requirements of the particular application in which the system 10 will be used. In addition, a pump 34 is provided to pump the flow of the fluid from the cold thermal storage tank 32 to the solar receiver 12.

In the exemplary embodiments, the fluid that is pumped from the cold thermal storage tank 32 and through the tubes 24 of the solar receiver 12 is a liquid metal (i.e., a metal in molten state). The liquid metal functions as a heat transfer and thermal storage medium for the system 10. In addition, the liquid metal also functions as a coolant that reduces and controls the temperature of the solar receiver 12.

The liquid metal allows for substantially higher operating temperatures than that which would be possible with other heat transfer mediums, such as molten salt. Indeed, the higher operating temperatures allow the system 10 to generate electricity in an efficient manner despite the absence of fossil fuel combustion. In addition, the system transfers the liquid metal in a closed loop system, which may be hermetically sealed such that the liquid metal is safely and completely contained within the system.

In one embodiment, the liquid metal is substantially pure sodium (Na), which has an operational temperature up to about 1618 degrees Fahrenheit without pressurization, i.e., at atmospheric pressure. In another embodiment, the liquid metal is an eutectic sodium potassium (NaK) mixture, which has an operational temperature up to about 1445 degrees Fahrenheit without pressurization, i.e., at atmospheric pressure. In either case, pressurization would allow for increased operational temperatures although system design is simplified when pressurization is not a factor. In addition, the system would also operate well above the freezing point which for sodium (Na) is about 200 degrees Fahrenheit, whereas the freezing point for the eutectic sodium potassium (NaK) mixture is about 0 degrees Fahrenheit. Regardless of whether sodium or a sodium potassium mixture is used for the liquid metal, the system 10 provides significant operating temperature margins.

In one embodiment, the liquid metal is pumped out of the cold thermal storage tank 32 to the solar receiver 12 at a temperature between about 300 and 400 degrees Fahrenheit. The liquid metal then flows through the tubes 24 of the solar receiver 12 in the manner previously described and is heated by the concentrated solar energy to temperatures which may approach the boiling point of the liquid metal at atmospheric pressure.

As shown in the exemplary embodiment, the heated liquid metal is discharged from the solar receiver 12 and flows into a hot thermal storage tank 36. The hot thermal storage tank 36 generally lies at ground level in close proximity to the lower 20. Alternatively, the hot thermal storage tank 36 can also be positioned on the tower. The hot thermal storage tank 36 may be sized according to the electrical power production requirements of the particular application in which the system 10 will be used.

The hot thermal storage tank 36 is sized to accumulate the heated liquid metal until the heated liquid metal is needed or desired for electrical power generation. Additionally, or alternatively, the system 10 and/or 110 (described below) may include an optional burner to heat liquid metal or air that can be used as needed or desired for electrical power generation. Accordingly, the hot thermal storage tank 36 and/or optional burner allows electrical power production that is not necessarily concurrent with sunshine. For example, electrical power production can be shifted to later hours or even provided twenty-four hours a day, if desired. The thermal storage increases electrical power dispatchability in a more economically practical manner than solar systems using costly photovoltaic (PV) cells and dish engines.

When needed to generate electricity, the liquid metal is pumped (via pump 38) out of the hot thermal tank 36 and circulated through the heat exchanger 40 between its first inlet and outlet 41 and 42. The liquid metal surrenders thermal energy or heat to air, which is also flowing within the heat exchanger 40 but between its second inlet and outlet 43 and 44. Prior to entering the heat exchanger 40, the air was compressed by the compressor 46.

The liquid metal can heat the air circulating through the heat exchanger 40 by indirect contact. In an exemplary embodiment, the heat exchanger 40 comprises a plurality of heat transfer tubes 45 through which the liquid metal flows. Heat from the liquid metal is transferred through the heat transfer tubes to the air external and adjacent the tubes.

Eventually, the liquid metal is discharged from the heat exchanger 40 via outlet 42 and flows back into the cold thermal storage tank 32 at a temperature of about 300 to 400 degrees Fahrenheit. Accordingly, the system 10 transfers the liquid metal in a closed loop system.

The heated compressed air is discharged from the heat exchanger 40 via outlet 44 and flows into an expander 48 via an inlet 50. The expander 48 is coupled to the generator 52 to drive the generator 52 and coupled to the compressor 46 to drive the compressor 46. As shown in FIG. 1, the expander 48 is mechanically linked on the same shaft as the compressor 46 and generator 52. Alternatively, the expander 48, compressor 46, and/or generator 52 may be provided on different shafts that are mechanically linked with each other. In some embodiments, the compressor 46, generator 52, and/or expander 50 can be positioned on the tower 20.

The expander 48 allows the air to expand to drive both a generator 52 to create electricity and drive the compressor 46 to compress the air. In at least some embodiments, the expander 48 is the sole source of energy for powering the generator 52 and the compressor 46.

The system 10 may optionally include a recuperator or heat recovery unit 54. The recuperator 54 recovers heat from the air exiting the expander 48 via outlet 56 before that air is exhausted to the surrounding atmosphere. The heat recovered by the recuperator 54 can be utilized by the system 10 as process heat.

In the illustrated embodiment, the recuperator 54 includes a first inlet and outlet 58 and 60 which are in fluid communication with one another via tubes 55, and a second inlet and outlet 62 and 64 which are in fluid communication with one another. In addition, the recuperator inlet 58 is also in fluid communication with the compressor outlet 66. The recuperator inlet 62 is also in fluid communication with the expander outlet 56. The recuperator outlet 60 is also in fluid communication with heat exchanger inlet 43. The recuperator 54 thus permits air flowing through tubes 55 between the recuperator inlet and outlet 62 and 64 (before that air is discharged through the outlet 64 into the surrounding atmosphere) to transfer thermal energy to the air flowing between the recuperator inlet and outlet 58 and 60.

As used herein, when a device or element is "in fluid communications" with another device or element, it may be directly connected, attached, or connected by one or more intervening devices or elements.

It should be noted that a wide range of materials may be used for the various tubes and pipes fluidically connecting the various devices of the system 10. In one embodiment, high-content nickel alloy tube and pipe materials are used in the system 10.

Optionally, the system 10 may further include a holding vessel 70 as described in U.S. Pat. No. 6,701,711, application Ser. No. 10/291,927, filed Nov. 11, 2002, entitled "Molten Salt Receiver Cooling System", the contents of which are incorporated herein by reference in their entirety as if fully set forth herein. In the event of a loss of flow or low flow condition, the holding vessel 70 provides a supplemental flow of the liquid metal to the solar receiver 12. Under normal pumped flow conditions, the holding vessel 70 is isolated from the flow of liquid metal through the solar receiver 12 by one or more isolation valves 72, which are normally closed. The isolation valve 72 opens upon a predetermined flow event, such as flow falling below a predetermined threshold. The isolation valve 72 may be any one of a wide variety of types. In one embodiment, the isolation valve 72 is an electromagnetic break.

In one embodiment, the system 10 may also include a modular control room 74 that houses various PC-based hardware and software that can be used to operate the system 10. The control room 74 and the equipment therein can be remotely located and be used to operate a plurality of systems 10.

A description will now be provided of an exemplary operational sequence in which the system 10 produces electricity in an air cycle without fossil fuel combustion or steam generation. The liquid metal is pumped 34 from the cold thermal storage tank 32 up the tower 20 and enters the receiver panels 22 of the solar receiver 12 via inlet 76. The liquid metal is heated by solar energy concentrated on the solar receiver 12 by the collector field 14 of sun tracking heliostats 16. From there, the hot liquid metal is discharged from the solar receiver 12 via outlet 78 and flows back down the tower 20 to the hot thermal storage tank 36. When needed to generate electricity, the liquid metal is pumped 38 out of the hot thermal storage tank 36 and circulated through the heat exchanger 40 between its inlet and outlet 41 and 42. The liquid metal surrenders thermal energy or heat to the air, which is also flowing within the heat exchanger 40 but between the inlet and outlet 43 and 44. The liquid metal is discharged from the heat exchanger 40 via outlet 42 and flows back into the cold thermal storage tank 32.

Air is introduced to the compressor 46 via the inlet 80. The air can be ambient air and/or conditioned air, such as ambient air that has been conditioned (cooled, filtered, and/or humidified). The compressor 46 compresses the air thus raising the temperature and pressure of the air. The compressed air is discharged from the compressor 46 via outlet 66 and flows into the recuperator 54 via inlet 58, whereat the temperature of the air is raised further. The air is discharged from the recuperator 54 via outlet 60 and next enters the heat exchanger 40 via inlet 43. In the heat exchanger 40, the air is heated to its peak temperature. The hot air is then discharged from the heat exchanger 40 via outlet 44 and flows into the expander 48 via inlet 50. The air flows through the expander 48 and expands, which causes rotation of the expander 48. The rotating expander 48 drives the generator 52 to produce electricity and drives the compressor 46 to compress air. The air exiting the expander 48 via outlet 56 is then directed into the recuperator 54 via inlet 62, whereat the air surrenders thermal energy before being exhausted through outlet 64 to the surrounding atmosphere.

Figure 3:
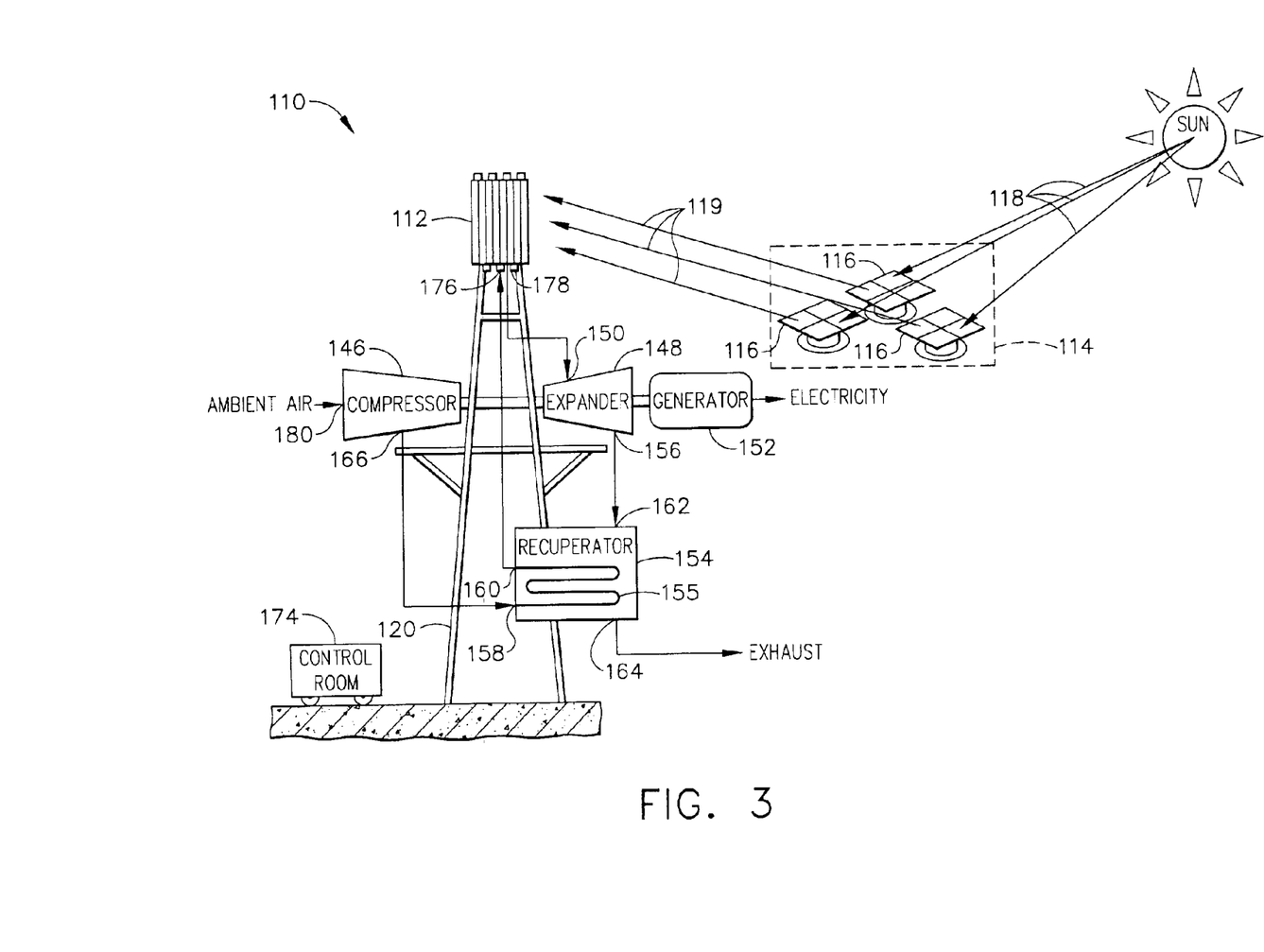
FIG. 3 is a schematic of a system for generating electrical power from solar energy according to another embodiment of the invention.

FIG. 3 shows another embodiment of a system 110 for generating electrical power from solar power in an air cycle without fossil fuel combustion or steam generation. As shown, the system 110 includes the solar receiver 112 and the collector system 114. The collector system 114 includes heliostats 116 that redirect and focus solar radiation or sunlight 118 onto the solar receiver 112, which then converts the redirected sunlight 119 to thermal energy or heat.

The solar receiver 112 includes a plurality of receiver tubes through which air flows in a similar manner as that described for the liquid metal in the first embodiment 10. The air flowing through the receiver tubes is heated by the solar energy concentrated on the solar receiver 112. Accordingly, the air functions as a heat transfer medium for the system 110. In addition, the air also functions as a coolant that reduces the temperature of the solar receiver 112.

As shown, the solar receiver 112 is mounted on the tower 120. In addition, the compressor 146, expander 148, and generator 152 are also mounted on the tower 120. Mounting the compressor 146, expander 148 and generator 152 on the tower 120 reduces the amount of ducting needed between the solar receiver 112 and the compressor 146 and expander 148, which, in turn, tends to reduce costs and improves energy efficiency of the system 110.

Optionally, the system 110 may also include a recuperator or heat recovery unit 154. The recuperator 154 recovers heat from the air exiting the expander 148 via outlet 156 before that air is exhausted via outlet 164 to the surrounding atmosphere. The heat exhausted by the recuperator 154 can be utilized as process heat elsewhere.

In the illustrated embodiment of FIG. 3, the recuperator 154 includes a first inlet and outlet 158 and 160 which are in fluid communication with one another via tubes 155, and a second inlet and outlet 162 and 164 which are in fluid communication with one another. In addition, the recuperator inlet 158 is also in fluid communication with the compressor outlet 166. The recuperator inlet 162 is also in fluid communication with the expander outlet 156. The recuperator outlet 160 is also in fluid communication with the solar receiver inlet 176, which in turn is in fluid communication with the receiver tubes of the solar receiver 112. The recuperator 154 thus permits air flowing outside the tubes 155 between the recuperator inlet and outlet 162 and 164 (before that air is discharged through the outlet 164 into the surrounding atmosphere) to transfer thermal energy to the air flowing between the recuperator inlet and outlet 158 and 160 within the tubes 155.

In one exemplary embodiment, the system 110 may also include a modular control room 174 that houses various hardware and software that can be used to operate the system 110. The control room 174 and the equipment therein can be remotely located and be used to operate a plurality of systems 110.

It should be noted that a wide range of materials may be used for the various tubes and pipes fluidically connecting the various devices of the system 110. In one embodiment, high-content nickel alloy tube and pipe materials are used in the system 110.

A description will now be provided of an exemplary operational sequence in which the system 110 produces electricity in an air cycle without fossil fuel combustion or steam generation. Ambient air and/or conditioned air (e.g., chilled, filtered, and/or humidified ambient air) is introduced into the compressor 146 via inlet 180. The compressor 146 compresses the air thus raising the temperature and pressure of the air. The compressed air is discharged from the compressor 146 via outlet 166 and flows into the optional recuperator 154 via inlet 158, whereat the temperature of the air is raised further. From there, the air enters the tubes of the solar receiver 112 via inlet 176. The air is heated to its peak temperature by the solar energy concentrated on the solar receiver 112 by the collector field 114 of sun tracking heliostats 116. The hot air is discharged from the solar receiver 112 via outlet 178 and flows into the expander 148 via inlet 150. The air flows through the expander 148 and expands, which causes rotation of the expander 148. The rotating expander 148 drives the generator 152 to produce electricity and provides energy to drive the compressor 146 to compress air. The air exiting the expander 148 via outlet 156 is then directed into the recuperator 154 via inlet 162, whereat the air surrenders thermal energy before being exhausted through outlet 164 to the surrounding atmosphere.

In another form, the present invention provides methods for generating electrical power in an air cycle, such as a Brayton air cycle, without fossil fuel combustion or steam generation. In one embodiment, the method generally comprises: heating the liquid metal by receiving the liquid metal within the solar receiver 12 and transferring solar generated heat from the solar receiver 12 to the liquid metal; compressing air; heating the compressed air by transferring thermal energy from the heated liquid metal to the compressed air; expanding the heated compressed air to drive the generator 52 to produce electricity, and to drive the compressor 46 to compress air; and discharging the expanded air to a surrounding atmosphere. Optionally, the method may further include transferring thermal energy from the expanded air to the compressed air before the expanded air is discharged to the surrounding atmosphere.

In another exemplary embodiment, the method generally comprises: compressing air; heating the compressed air by receiving the compressed air within a plurality of receiver tubes of the solar receiver 112 and transferring solar generated heat from the solar receiver 112 to the compressed air as the compressed air flows through the receiver tubes; expanding the heated compressed air to drive the generator 152 to produce electricity, and to drive the compressor 146 to compress air. The method also includes discharging the expanded air to a surrounding atmosphere. Optionally, the method may further include transferring thermal energy from the expanded air to the compressed air before the expanded air is discharged to the surrounding atmosphere.

Accordingly, embodiments of the invention provide clean and cost-effective ways of generating dispatchable electrical power from solar energy through the use of an air cycle, such as a Brayton air cycle, without the need for either fossil fuel combustion or steam generation. In addition, embodiments of the invention also utilize (e.g., leverage and integrate) proven reliable components, such as existing combustion turbine designs modified to remove the burner.

Embodiments of the invention provide financially practical, cost-competitive options to companies required to or simply desiring to utilize a non-polluting source of electrical power. Embodiments provide more cost-effective and reliable alternatives to the more costly and complicated solar systems that produce electricity through the use of Rankine cycles wherein solar energy is used to heat water to steam, with the steam then being expanded through a turbine to turn a generator.

Embodiments may also include a modular design which allows for rapid placement into operation with a short site construction. For example, system components can be pre-built and brought to the site on skids, such as the generator. Or for example, the tower can be a modular unit that is shipped as a single unit and then assembled (e.g., welded together) in the field.

In addition, embodiments can be highly automated (e.g., requiring no user intervention other than computer commands for startup and shutdown) and be operated by a single person on a part time basis, which allows that same operator to oversee the operation of other systems. With relatively few moving parts, embodiments are also highly reliable requiring very low maintenance.

It should be noted that the common fluid elements, such as pumps, valves, piping, heat exchangers, etc., should be designed in accordance with the constraints of the particular system embodiment in which they will be used. For example, an exemplary constraint of the system 10 includes operability at relatively high temperatures depending on the particular liquid metal being used. Additionally, the particular flow characteristics, mass transfer capabilities, and heat transfer capabilities will vary according to the design requirements of the particular system. Also, liquid metals solidify at temperatures higher than ambient temperatures, and vessels, tanks, or other elements that store the liquid metal will require heating elements capable of maintaining the liquid metal in a liquid or molten state when solar thermal energy is not available.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A system capable of producing electrical power from solar energy through the use of an air cycle without fossil fuel combustion, the system comprising:
    a liquid metal source;
    a solar receiver adapted to receive liquid metal from the liquid metal source and to transfer solar generated heat to the liquid metal;
    a heated liquid metal storage tank sized according to electrical power requirements and having a heating element capable of heating and maintaining the liquid metal stored in the tank in a molten liquid state when solar thermal energy is not available;
    a pump for pumping the heated liquid metal from the storage tank when needed to generate electrical power;
    a compressor adapted to receive and compress air;
    a heat exchanger adapted to receive the heated liquid metal and the compressed air, the heat exchanger allowing the heated liquid metal to transfer thermal energy to the compressed air;
    a generator for producing electrical power;
    an expander coupled to the generator and the compressor, the expander receiving and expanding the heated compressed air from the heat exchanger to drive the generator to produce electricity, and to drive the compressor to compress the air.

2. The system of claim 1, wherein:
    the solar receiver includes an inlet in fluid communication with the liquid metal source and an outlet, the inlet and outlet permitting the liquid metal to flow through the solar receiver;
    the compressor includes an inlet for receiving air and an outlet for discharging compressed air;
    the expander includes an inlet and an outlet;
    the heat exchanger includes:
        a first inlet in fluid communication with the solar receiver outlet;
        a first outlet in fluid communication with the liquid metal source;
        a second inlet in fluid communication with the compressor outlet;
        a second outlet in fluid communication with the expander inlet;
        the first inlet and outlet permitting the heated liquid metal to flow through the heat exchanger; and
        the second inlet and outlet permitting the compressed air to flow through the heat exchanger.

3. The system of claim 1, wherein the heated liquid metal storage tank is adapted to receive the heated liquid metal from the solar receiver and to deliver the heated liquid metal to the heat exchanger.

4. The system of claim 1, wherein the liquid metal source comprises a cold thermal storage tank adapted to deliver liquid metal to the solar receiver inlet.

5. The system of claim 1, further comprising a recuperator adapted to receive the expanded air from the expander and the compressed air from the compressor, the recuperator allowing the expanded air to transfer thermal energy to the compressed air.

6. The system of claim 1, wherein the solar receiver comprises a plurality of receiver tubes adapted to receive the liquid metal from the liquid metal source, the solar receiver transferring the solar generated heat to the liquid metal as the liquid metal flows through the receiver tubes.

7. The system of claim 1, wherein the liquid metal comprises sodium.

8. The system of claim 1, wherein the liquid metal comprises a mixture of sodium and at least one other liquid metal.

9. The system of claim 8, wherein the at least one other liquid metal comprises potassium.

10. The system of claim 1, wherein the air cycle is a Brayton air cycle.

11. A method of producing electrical power from solar energy through the use of an air cycle without fossil fuel combustion, the method comprising:
    compressing air;
    receiving a liquid metal within a solar receiver having a plurality of solar receiver panels comprising a plurality of receiver tubes;
    transferring the solar generated heat from the solar receiver to the liquid metal to heat the liquid metal as it flows through the receiver tubes;
    storing the heated liquid metal;
    pumping the heated liquid metal to a heat exchanger when needed to generate electrical energy;
    transferring thermal energy from the heated liquid metal to the compressed air in the heat exchanger; and
    expanding the heated compressed air to drive a generator to produce electricity, and to drive a compressor to compress the air.

12. The method of claim 11, wherein storing the heated liquid metal further comprises operating a heater element capable of heating the liquid metal to a temperature effective for maintaining the liquid metal in a liquid molten state thermal energy is not available.

13. The method of claim 11, further comprising delivering the liquid metal from a cold thermal storage tank to the solar receiver.

14. The method of claim 11, wherein the liquid metal comprises sodium.

15. The method of claim 11, wherein the liquid metal comprises a mixture of sodium and at least one other liquid metal.

16. The method of claim 15, wherein the at least one other liquid metal comprises potassium.

17. The method of claim 11, wherein transferring thermal energy from the heated liquid metal to the compressed air comprises receiving the heated liquid metal and the compressed air within the heat exchanger.

18. The method of claim 11, further comprising transferring thermal energy from the expanded air to the compressed air.

19. The method of claim 18, wherein transferring thermal energy from the expanded air to the compressed air comprises receiving the expanded air and the compressed air within a recuperator.

20. The method of claim 11, wherein expanding the heated compressed air comprises receiving the heated compressed air within an expander coupled to the generator and coupled to the compressor.

21. The method of claim 11, further comprising discharging the expanded air to a surrounding atmosphere.

22. The method of claim 11, further comprising positioning the solar receiver, the compressor, and the generator on a tower.

23. The method of claim 11, wherein the air cycle is a Brayton air cycle.

24. A method of producing electrical power from solar energy through the use of an air cycle without fossil fuel combustion, the method comprising:

heating a liquid metal by receiving a liquid metal within a solar receiver and transferring solar generated heat from the solar receiver to the liquid metal;

storing the heated liquid metal;

pumping the heated liquid metal to a heat exchanger when the liquid metal is needed to generate electrical energy;

compressing air;

heating the compressed air by transferring thermal energy from the heated liquid metal to the compressed air in the heat exchanger; and expanding the heated compressed air to drive a generator to produce electricity, and to drive a compressor to compress the air.

25. The method of claim 24, wherein heating a liquid metal comprises:

receiving the liquid metal within a plurality of receiver tubes within the solar receiver; and transferring the solar generated heat from the solar receiver to the liquid metal as the liquid metal flows through the receiver tubes.

26. The method of claim 24, further comprising receiving the heated liquid metal within a hot thermal storage tank.

27. The method of claim 24, further comprising delivering the liquid metal from a cold thermal storage tank to the solar receiver.

28. The method of claim 24, wherein the liquid metal comprises sodium.

29. The method of claim 24, wherein the liquid metal comprises a mixture of sodium and at least other liquid metal.

30. The method claim 29, wherein the at least one other liquid metal comprises potassium.

31. The method of claim 24, further comprising transferring thermal energy from the expanded air to the compressed air.

32. The method of claim 31, wherein transferring thermal energy from the expanded air to the compressed air comprises receiving the expanded air and the compressed air within a recuperator.

33. The method of claim 24, wherein heating the compressed air comprises receiving the heated liquid metal and the compressed air within a heat exchanger.

34. The method of claim 24, wherein expanding the heated compressed air comprises receiving the heated compressed air within an expander coupled to the generator and coupled to the compressor.

35. The method of claim 24, further comprising discharging the expanded air to a surrounding atmosphere.

36. The system of claim 1, wherein the heat changer only receives heated liquid metal from the heated liquid storage tank.

37. The system of claim 1, wherein the expander only receives thermal energy from the heated liquid metal pumped from the heated liquid storage tank.

38. The method of claim 11, wherein the heat exchanger only receives heated liquid metal from the heated liquid storage tank.

39. The method of claim 20, wherein the expander only receives thermal energy from the heated liquid metal pumped from the heated liquid storage tank.

40. The method of claim 24, wherein the heat exchanger only receives heated liquid metal from the heated liquid storage tank.

41. The method of claim 34, wherein the expander only receives thermal energy from the heated liquid metal pumped from the heated liquid storage tank.

* * * * *